Oct. 27, 1964  H. A. ZAGORITES ETAL  3,154,686
PORTABLE GAMMA INTENSITY TIME RECORDER
Original Filed Jan. 27, 1960  2 Sheets-Sheet 1

INVENTORS
HARRY A. ZAGORITES
MARKO I. LIPANOVICH
BY LAURENCE A. PERRINE

ATTORNEYS

Oct. 27, 1964 H. A. ZAGORITES ETAL 3,154,686
PORTABLE GAMMA INTENSITY TIME RECORDER
Original Filed Jan. 27, 1960 2 Sheets-Sheet 2

INVENTORS
HARRY A. ZAGORITES
MARKO I. LIPANOVICH
BY LAURENCE A. PERRINE

ATTORNEYS

सेstates Patent Office 3,154,686
Patented Oct. 27, 1964

3,154,686
PORTABLE GAMMA INTENSITY TIME RECORDER
Harry A. Zagorites, 82 Montana St., San Francisco, Calif.;
Laurence A. Perrine, 520 San Mateo Ave., Pacifica,
Calif.; and Marko I. Lipanovich, 514 Distel Drive, Los
Altos, Calif.
Continuation of application Ser. No. 5,078, Jan. 27, 1960.
This application Mar. 6, 1962, Ser. No. 177,930
13 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

This application is a continuation of application, Serial No. 5,078, filed January 27, 1960, for Portable Gamma Intensity Time Recorder, now abandoned.

The present invention relates to a portable gamma intensity time recorder and more particularly to a portable gamma intensity time recorder employing a plurality of radiation detectors, a hybrid electrometer blocking oscillator associated with each radiation detector, and time signal generating means, all of which are recorded as separate tracks on a single magnetic tape recorder.

The prior art techniques for recording nuclear radiation data generally employ a radiation detector followed by a simple electrometer amplifier. The output of the electrometer amplifier is usually converted to a current or voltage analog of the intensity of radiation; i.e., dose rate, and recorded on a paper strip chart. The limitations imposed by the resolution of paper recorders necessitates the conversion to a compressed function if more than two decades are to be recorded—resulting in the final analog plot being a nonlinear function of the radiation intensity. These systems obviously have a number of inherent limitations both in accuracy and portability. The more striking of the limitations are low over-all accuracy and reproducibility caused by the compressed conversion and recorder resolution, poor time resolution caused by the slow recorder response time and resolution, and difficult data reduction due to the problems encountered in sensing and interpreting the compressed graphic presentation. Among the portability considerations are the lack of ruggedness, which is due to the construction of paper recorders and ink writers, the large power requirements of the paper drive mechanisms, and the bulkiness associated with the wide chart, which of necessity must be of considerable length. A further disadvantage in applications requiring unattended operation is the high and frequent maintenance requirements due in the main to the ink and paper feed.

It is thus an object of the present invention to provide a portable gamma intensity time recorder in which the dose increments are recorded linearly with time.

Another object of the invention is the provision of a portable gamma intensity time recorder which utilizes magnetic recording techniques.

A further object is to provide a portable gamma intensity time recorder which is compact, rugged, and requires little attendance and maintenance.

Still another object of the present invention is the provision of a portable gamma intensity time recorder which has extremely small power requirements commensurate with battery operation and very long unattended operating periods and recording time.

Yet another object is to provide a portable gamma intensity time recorder with a plurality of detecting and conversion channels covering a plurality of intensity ranges.

According to the invention two radiation detectors covering different but overlapping ranges feed two recording channels. The output of each radiation detector triggers a recycling electrometer. Each recycling electrometer comprises a hybrid blocking oscillator which utilizes positive feedback between the electrometer tube plate and the cathode-filament through a transformer-coupled transistor in the emitter follower connection. The output of each recycling electrometer is taken across the associated emitter follower to the primary of a step down transformer. Across the primary is a zener diode which limits the output pulse in accordance with the breakdown rating of the diode and in so doing sets the initial bias voltage on the electrometer in conjunction with its associated radiation detector. The output of each channel of detection is coupled to a separate channel of the magnetic recording head associated with the tape recorder. At the instant filament power is applied to the electrometer tubes, control circuitry applies power to the recorder motor and a timer motor. The timer motor is mechanically coupled to a cam which trips a switch in a resistance-capacity network which in turn produces timing pulses. The timing pulses are fed to the time channel of the recording head. Each of the data channels and the time channel of the recording head modulate a separate track on a single tape recorder. The inherent ruggedness and compactness of a tape recorder overcome two of the major limitations of the paper chart system. The output pulses are amplified and shaped efficiently by the use of the electrometer-transistor hybrid blocking oscillator, with the voltage and power requirements associated therewith kept at a strict minimum. Dose accuracy is held to a maximum by the utilization of zener diodes in the initial biasing arrangement on the electrometer tubes, and the unique start-stop control circuitry which controls operating power to the entire equipment, not only holds down control power requirements but insures start and stop tracking of the entire system.

Other objects and many of the attendant advantages of this invention will be readily appreciated as the same becomes better understood by reference to the following detailed description when considered in connection with the accompanying drawing in which like reference numerals designate like parts throughout the figures thereof and wherein.

Figure 1:
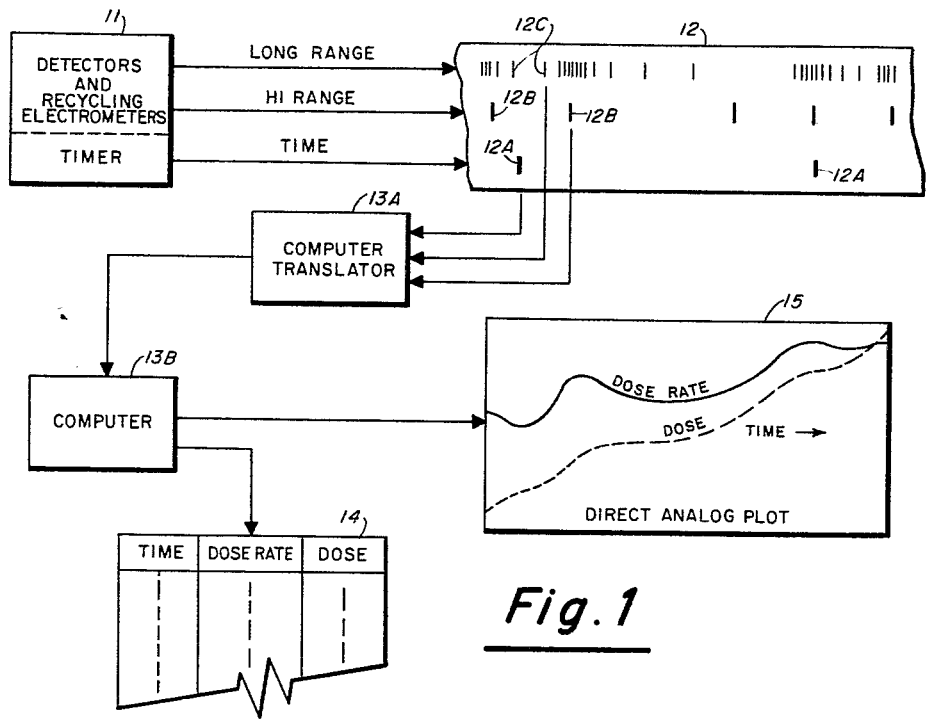
FIG. 1 is a system block and illustration of the present invention.

Referring to FIG. 1 the timer, detectors, and recycling electrometers are shown at block 11, the outputs of which are coupled to a tape recorder indicated as the tape at 12. The output of the tape recorder is coupled to computer translator 13a and hence to the computer 13b. The outputs of the computer are indicated by tabular presentation 14 and direct analog presentation 15.

Figure 2:
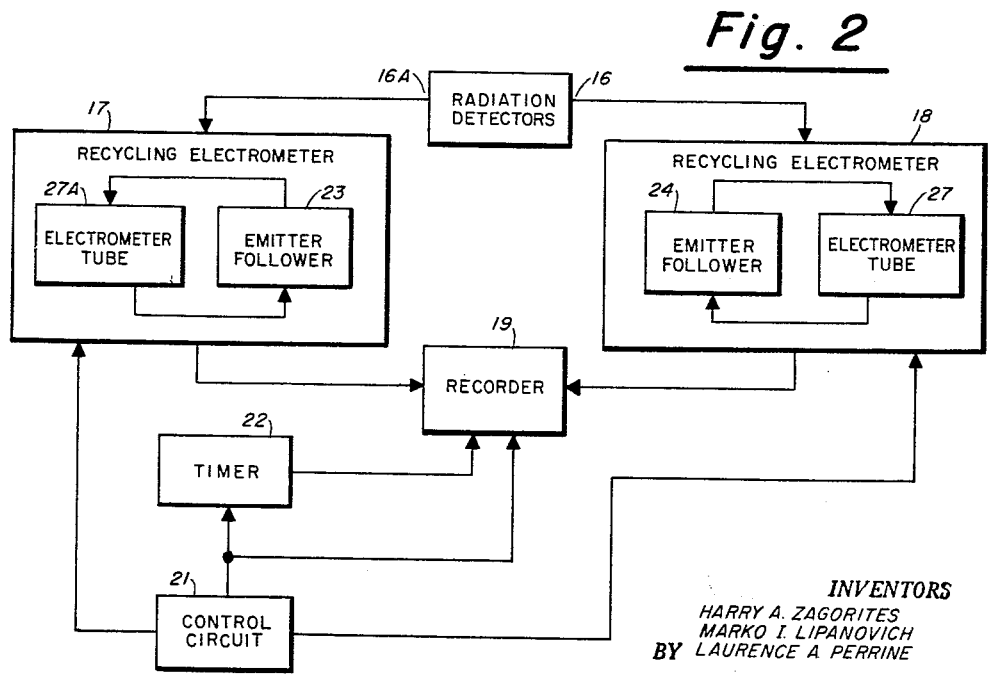
FIG. 2 is a detailed block of the recording system.

In FIG. 2 there are shown radiation detectors 16 and 16a having one output to recycling electrometer 17 and another output to recycling electrometer 18. Recycling electrometers 17 and 18 are each connected to recorder 19. Control circuit 21 is coupled to recycling electrometers 17, 18, timer 22 and recorder 19. The timer 22 is connected to recorder 19.

Figure 3:
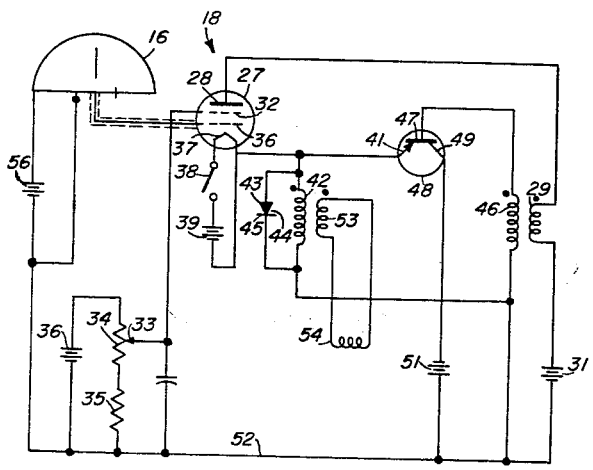
FIG. 3 is a schematic representation of the recycling electrometer circuits of FIG. 2.

Referring to FIG. 3 there is shown a schematic representation of the radiation detector 16, such as an ionization chamber, and recycling electrometer 18 of FIG. 2. Ionization chamber 16 is coupled to control grid 36 of electrometer tube 27. Plate 28 is connected through primary 29 to the positive side of battery 31. Screen grid 32 is coupled to sliding contact 33 of resistor 34. Resistor 34 is connected between resistor 35 and battery 36, the negative side of battery 36 being connected to the other side of battery 31. Cathode-filament 37 is connected through relay contact 38 to one side of battery 39, the other side of which is connected also to cathode-filament 37. Cathode-filament 37 is also connected to emitter 41 of transistor 48, primary winding 42, and the anode 43 of zener diode 44. The cathode 45 of zener diode 44 is connected to the other end of primary winding 42 and to one side of secondary winding 46, the other side of secondary winding 46 being connected to base 47 of transistor 48. Collector 49 of transistor 48 is connected to the negative terminal of battery 51, the positive terminal of which is connected to the common lead, 52. Secondary winding 53 is connected to recording head 54. Ionization chamber 16 is also connected to battery 56, the negative side of which is connected to common bus 52.

Figure 4:
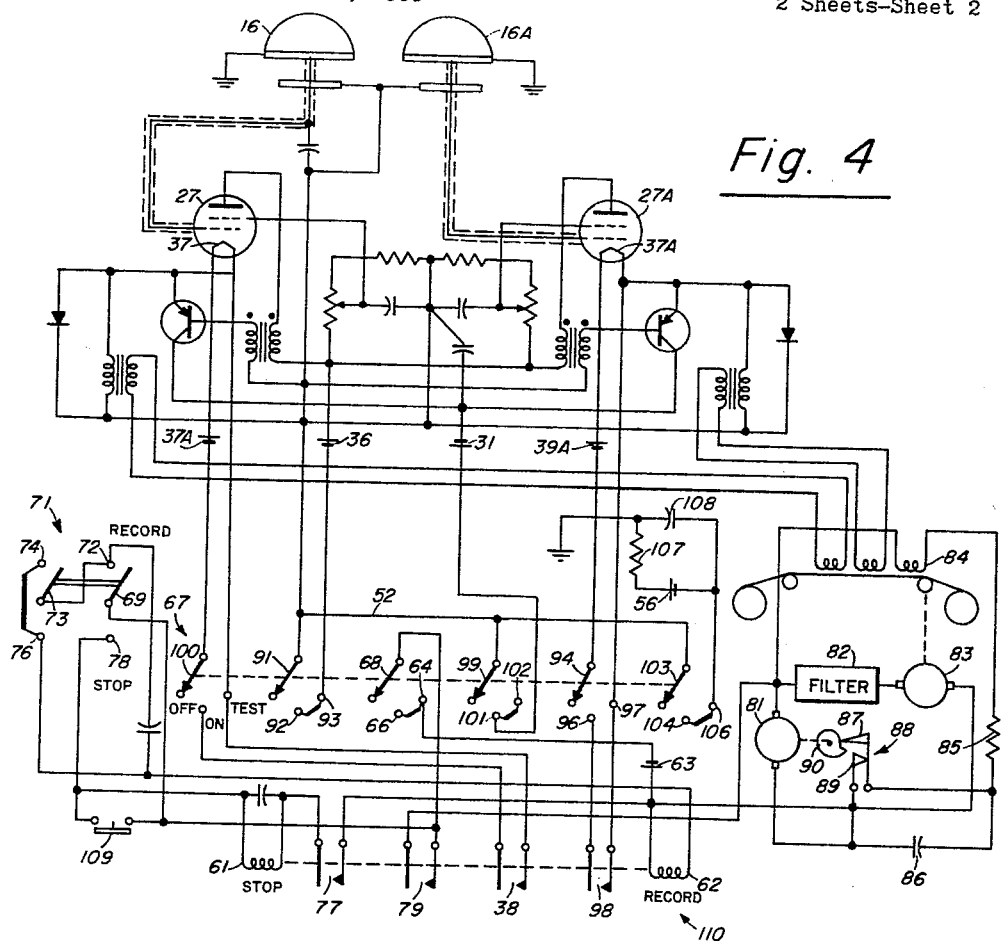
FIG. 4 is a schematic representation of the entire preferred embodiment of the present invention.

Referring now to FIG. 4 in detail, it is pointed out that the two electrometer tubes 27 and 27a and associated circuits are identical. The sole difference being the inputs from ionization chambers 16 and 16a as will be explained in detail. The control circuitry comprises stop-record relay 110 with stop solenoid 61 and record solenoid 62. Record solenoid 62 is connected to one side of battery 63, the other side of which is connected through contacts 64 and 66 of switch 67. Contact arm 68 of switch 67 is connected to contact arm 69 of switch 71. Contact 72 of switch 71 is connected to contact arm 73 of switch 71. Contact 74 of switch 71 is connected to contact 76 of switch 71 which is connected to the other side of record solenoid 62. The first side of battery 63 is also connected through relay contact 77 to one side of stop solenoid winding 61, the other side of which is connected to contact 78 of switch 71, and through switch 109, which is closed by a conducting section at the end of the reel of magnetic tape, to contact arm 69 of switch 71. Contact arm 68 of switch 67 is also connected through relay contact 79 to timer motor 81 and through filter 82 to recorder motor 83. Relay contact 79 is also connected to recording head 84, the other side of which is connected through resistor 85 to capacitor 86 and contact 87 of cam switch 88. Contact 89 of cam switch 88 is connected to the other side of capacitor 86 and to the other side of timer motor 81 and recorder motor 83 and the one side of battery 63. Contact arm 91 of switch 67 is connected from the common bus 52 through contacts 92 and 93 to one side of battery 36. Contact arm 94 of switch 67 is connected through contacts 96 and 97 of switch 67 to cathode filament 37a and battery 39a. The other side of battery 39a is connected to contact arm 94 of switch 67. Contacts 96 and 97 are connected together through relay contact 98. Contact arm 99 is connected to common bus 52 and through contacts 101 and 102 of switch 67 to one side of battery 31. Contact arm 103 of switch 67 is connected through contacts 104 and 106 to battery 56 and directly to common bus 52. Battery 56 is connected through resistance 107 to chassis ground, and capacitor 108 is connected across the series combination of battery 56 and resistor 107.

*Operation*

Referring back to FIG. 1, the general operation of the entire system will be described. The timing pulse generator condensed in block 11 is applied to one track of tape 12 and is indicated by the tape signals 12a. This applies a linear time marker against which the dose bits are recorded. The output of the detector and recycling electrometer high range channel is applied as bits of information shown on the tape at 12b, and the output of the detector and recycling electrometer low range channel are applied to the tape recorder as shown by the markings 12c. This information is then coupled via a magnetic pickup (not shown) to the computer translator 13a and the computer 13b. These blocks have the function of converting the magnetically recorded signals to a tabular presentation indicated at 14; i.e., dose rate and total dose are printed in decimal form together with the related chronological time. A second output can be taken providing a direct analog plot by converting the digital information into analog voltage and plotting the dose rate and total dose as a function of time as shown in plot 15. Since the readout equipment does not form a part of the present invention this equipment will not be gone into in detail. Suffice it to say the dose can be acquired by a mere integration of the data bits taken from the tape recorder and the dose rate, of course, is the time differential of the total dose.

Referring now to FIG. 2, the block 11 of FIG. 1 has been broken down into a complete and detailed block diagram which includes a recorder represented by tape 12 of FIG. 1. The output from one detector is coupled to the input of recycling electrometer 17 and the output from the other detector to recycling electrometer 18. Recycling electrometers 17 and 18 are identical and in this embodiment electrometer tubes 27a and 27 are utilized due to their desirable characteristics for radiation and detection application. Emitter followers 23 and 24 are utilized to couple the output of each electrometer tube back to the input which provide the necessary regenerative feedback for blocking oscillator action. It has been found that this hybrid arrangement of electrometer tube and transistor is particularly useful in this environment due to the minimal power requirements of electrometer tubes and transistors. The outputs of the recycling electrometers 17 and 18 are each fed to recorder 19 and recorded thereby on separate channels. Control circuit 21 is a unique lock-relay arrangement requiring very little power and used to apply power to electrometer tubes 27 and 27a and to start the timer motor and the recorder in operation. Timer 22 then supplies timed pulse to a third input of recorder 19 which, of course, sets up the recorded data bits against a time base.

Since recycling electrometer 17 composed of electrometer tube 27a and emitter follower 23 is identical to recycling electrometer 18 composed of electrometer tube 27 and emitter follower 24, a complete description of only one is deemed necessary. FIG. 3 is a schematic representation of either one of these recycling electrometer systems. Ionization chamber 16 is energized by battery 56 in the conventional manner, battery 56 being on the order of 300 volts. The initial circuit conditions of electrometer tube 27 is cut off due to the charging of the capacity of ionization chamber 16 from battery 56, the charge loop being from one side of ionization chamber 16 through battery 56, through battery 51, transistor 48, cathode-filament 37 to grid 36, and back to one side of the ionization chamber. When the voltage on grid 36 has become sufficiently positive due to the reduction of electrical charge by the radiation field in chamber 16, tube 27 begins conducting, the conduction path of tube 27 being from cathode-filament 37 to plate 28 through primary winding 29, battery 31, battery 51, transistor 48, and back to cathode-filament 37. As current is passed through winding 29 a voltage appears on winding 46 in phase with the voltage in winding 29; i.e., the base 47 of transistor 48 will swing negative. Since transistor 48 is connected in an emitter follower configuration, emitter 41 will follow the voltage on base 47 which in turn reduces the net bias on electrometer tube 27. This, of course, increases the current flow through the electrometer tube and winding 29 which drives the base 47 more negative and reduces the bias further on electrometer tube 27. This continues until electrometer tube 27 is conducting heavily and current flows from grid 36 to recharge ionization chamber 16. When the gain through the electrometer tube and the feedback loop drops below unity, the top of winding 46 will swing positive causing the base of transistor 48 to swing positive which in turn increases the bias in tube 27. At this point this action continues until electrometer tube 27 is again cut off due to the bias on grid 36 resulting from the net charge on the capacity of chamber 16 in grid 36, which is the normal one-shot blocking oscillator action. The output from the recycling electrometer then is taken at the emitter 41 of transistor 48 through primary winding 42 back to the common bus 52. Electron flow will be in the reverse direction through zener diode 44; i.e., from anode 43 to cathode 45. Zener diode 44 clamps the voltage at approximately 11 volts across primary winding 42. This serves two functions. The first is the limiting of the signal voltage applied to recording head 54, and the second is bias regulation on the electrometer tube 27. Since the cathode 45 of zener diode 44 is referenced to the common bus 52, the cathode-filament of electrometer tube 27 will be at the voltage dropped across zener diode 44. Referring back to the charging loop of ionization chamber 16, the cathode-filament being in the charging loop will in essence set the total charge on ionization chamber 16 at 310 volts or at the battery voltage 56 plus the cathode-filament voltage 39 minus the drop of about 1 volt from the virtual cathode to the top of winding 42, since the voltage rises and drops of the electrical loop must be equal to zero. Thus, ionization chamber 16 will always regain its full charge at the same potential; i.e., 310 volts during the conduction cycle of the electrometer 27 and transistor 48. Since the charge voltage $V_1$ on the fixed capacity C of chamber 16 is reproduced accurately at the start of each cycle, the quantity of charge Q on capacity C is also reproduced accurately at the start of each cycle, as related in $Q-CV_1$. Since the electrometer tube 27 will begin to conduct when the charge voltage $V_2$ is reached on the capacity C, the charge transfer $\Delta Q$ for each cycle is $\Delta Q = C(V_1 - V_2)$. $\Delta Q$ is a linear function of gamma radiation dose, and calibration is achieved by adjusting C, and/or $V_1$, and/or $V_2$ in order to fix $\Delta Q$. In this embodiment, $V_2$ is normally adjusted. By varying the voltage on grid 32 of electrometer tube 27, $V_2$ will vary in accordance with the expected transfer function relating plate current in electrometer tube 27 and voltage on grid 36 as a function of voltage on grid 32. The voltage on grid 32 is varied through sliding arm 33 of resistance 34 which is connected to one side of resistance 36 and to one side of resistance 35. The other sides of battery 36 and resistance 35 are returned to the common bus 52.

Referring now to FIG. 4, the operation of the entire equipment will be described in detail. Switch 67 has contact arms 91, 94, 99, 103, 68 and 100, all mechanically ganged as the "off-on-test" switch. In the "off" position, as shown, no operating power from any of the batteries is applied to any part of the equipment. In the "on" position filament power is applied to electrometer tubes 27 and 27a via switch arms 100 and 94 and contacts 38 and 98 of relay 110. The plate and screen potentials of electrometer tubes 27 and 27a are applied through switch arm 91, contact 92 and contact 93 of switch 67. Transistors 48 and 48a are connected to battery 31 through contact arm 99 and contacts 101 and 102 of switch 67. Radiation detector 16 receives its operating potential from battery 56 through contacts 106 and 104 and arm 103 of switch 67. Thus, when switch 67 is thrown to the "on" position, the above mentioned potentials are applied directly as stated. Switch arm 68 of switch 67 applies battery 63 to the switch arm 69 of "record-stop" switch 71. "Record-stop" switch 71 is a three position switch with the center position normal and momentary contact in the record and stop positions. The record solenoid 62 receives its actuating current through switch arm 69 of switch 71, terminal 72, switch arm 73, terminal 74 and terminal 76. Thus, when switch 71 is pressed to the "record" position solenoid 62 is energized closing all of the relay 110 contacts: 38, 77, 79 and 98. This completes the filament power to electrometer tubes 27 and 27a and applies operating power to timer motor 81 and recorder motor 83. Condenser 86 begins to charge through resistor 85 and recording head 84. When cam 90, which is mechanically ganged to timer motor 81 closes contacts 87 and 89, as shown, capacitor 86 is shorted which produces a pulse through recording head 84. In the preferred embodiment this cam is operated at 16 r.p.m. which, of course, produces 16 pulses per minute at recording head 84. Filter 82 is inserted between the recorder motor 83 and contact 79 of relay 110 to reduce electrical motor transients appearing at the terminals of battery 63. When switch 71 is depressed to the stop position, switch arms 69 and 73 contact terminals 78 and 76, respectively. This will energize momentarily the stop solenoid 61. Stop solenoid 61 opens contacts 38, 77, 79 and 98 de-energizing the entire equipment with the exception of the applied voltages to the plates and screens of electrometer tubes 27 and 27a and transistors 48 and 48a. Since the control circuitry including the recorder and recording head can be remotely located from the radiation detector and recycling electrometer portions of the equipment, it may be desired to operate the detector and recycling electrometer portion on a cable at a distance from the remainder of the instrument. Calibration and testing of the chamber and recycling electrometer without recording and timing has been provided by the inclusion of a test position on the main switch 67. It is to be noted that the only difference between the "on" and the "test" positions is that the test positions bypass relay 110 contacts 38 and 98, which are in series with the filaments of electrometer tubes 27 and 27a, obviating the necessity for throwing switch 71 to the "record" position. It is further pointed out that solenoids 61 and 62 are only actuated momentarily the contacts locking mechanically either in the open or closed position.

Obviously, many modifications and variations of the present invention are possible in the light of the above teachings. It is intended to cover all such modifications and variations which do not depart from the spirit and scope of this invention.

What is claimed is:

1. An apparatus for detecting and recording radiation intensity as a function of time which comprises a first radiation detector of the integrating type which produces a D.C. voltage output signal which progressively changes in potential in response to the aggregative amount of radiation detected by said detector over a given time interval; a first recycling electrometer, whose input is connected to the output of said first detector, for producing an output pulse whenever the output voltage of said first detector reaches a certain predetermined level; a second radiation detector of the integrating type which produces a D.C. voltage output signal which progressively changes in potential in response to the aggregative amount of radiation detected by said detector over a given time interval; a second recycling electrometer whose input is connected to the output of said second detector, for producing an output pulse whenever the output voltage of said first detector reaches a certain predetermined level; recording means for receiving and recording concurrently in correlative fashion a plurality of signal pulse trains from different sources, said recording means being connected to the respective outputs of said first and said second recycling electrometers; timing signal generating means for generating a train of timing pulses, the output of said timing signal generating means being connected to said recording means; and control means, connected respectively to said timing signal generating means, to said recording means and to said first and said second recycling electrometers for controllably energizing these respective elements; said first and said second radiation detectors being respectively sensitive to different ranges of intensity of the radiation being detected, the respective pulse trains from said first and said second recycling electrometers being individually recorded by said recording means with reference to a time base defined by said timing pulses, whereby said apparatus for detecting and recording radiation intensity reflects the radiation intensity linearly with respect to time without compressed conversion of such radiation intensity data.

2. The apparatus of claim 1 wherein said first and said second radiation detectors are coaxially disposed with respect to one another and one of said detectors is disposed within the other of said detectors.

3. The apparatus of claim 1 wherein each of said recycling electrometers comprises an electrometer-amplifier and a regenerative feedback means connected in parallel therewith.

4. The apparatus of claim 1 wherein each of said recycling electrometers comprise an electrometer tube having cathode, plate and control electrodes; a regenerative feedback circuit interconnecting the plate and cathode electrodes of said electrometer tube; and means, connected to said electrometer tube, for regulating the bias on said electrometer tube to ensure that each of said detectors assumes its same initial voltage output state at the start of each radiation detection cycle associated therewith.

5. The apparatus of claim 4 wherein said regenerative feedback circuit comprises an emitter follower transistor amplifier coupling variations of electrometer tube plate current to the electrometer tube cathode in a phase to reduce the bias of said electrometer tube when the electrometer tube plate current increases.

6. The apparatus of claim 1 wherein said recording means comprises a tape recorder having a suitably driven tape, adapted to have concurrently recorded thereon a plurality of individual signal tracks, and a recording head in operative registry with said tape, said recording head being adapted to concurrently receive and record, on individual tracks on said tape, signal pulses from each of said recycling electrometers and from said timing signal generating means.

7. An apparatus for detecting and recording radiation intensity as a function of time which comprises a radiation detector of the integrating type which produces a D.C. voltage output signal which progressively changes in potential in response to the aggregative amount of radiation detected by said detector over a given time interval; a recycling electrometer, whose input is connected to the output of said detector, for producing an output pulse whenever the output voltage of said detector reaches a certain predetermined level; recording means for concurrently receiving and recording on individual tracks a plurality of pulse trains from different sources, the output of said recycling electrometer being connected to said recording means; timing signal generating means for generating a train of timing pulses which are asynchronous with respect to the output pulses from said recycling electometer, the output of said timing signal generating means being connected to said recording means, said timing pulses being recorded by said recording means to furnish a time base for time correlation of the pulses coming from said recycling electrometer; and control means connected respectively to said timing signal generating means, to said recording means and to said recycling electrometer for controllably energizing these respective elements.

8. The apparatus of claim 7 wherein said recycling electrometer comprises an electrometer-amplifier and a regenerative feedback means connected in parallel therewith.

9. The apparatus of claim 7 wherein said recycling electrometer comprises an electrometer tube having cathode, plate and control electrodes; a regenerative feedback circuit interconnecting the plate and cathode electrodes of said electrometer tube; and means, connected to said electrometer tube, for regulating the bias on said electrometer tube to ensure that said radiation detector assumes the same initial voltage output state at the start of each radiation detection cycle associated therewith.

10. The apparatus of claim 9 wherein said regenerative feedback circuit comprises an emitter follower transistor amplifier coupling variations of electrometer tube plate current to the electrometer tube cathode in a phase to reduce the bias of said electrometer tube when the electrometer tube plate current increases.

11. The apparatus of claim 7 wherein said recording means comprises a tape recorder having a tape, adapted to have concurrently recorded thereon a plurality of individual signal tracks and a recording head in operative registry with said tape, said recording head being adapted to concurrently receive and record, on individual tracks on said tape, signal pulses from said electrometer and from said timing signal generating means, the signal pulses from said timing signal generating means defining a time base for the signal pulses from said electrometer.

12. An apparatus for detecting and recording radiation intensity as a function of time which comprises a first radiation detector of the integrating type which produces a D.C. voltage output signal which progressively changes in potential in response to the aggregative amount of radiation detected by said detector over a given time interval; a first recycling electrometer, whose input is connected to the output of said first detector, for producing an output pulse whenever the output voltage of said first detector reaches a certain predetermined level; a second radiation detector of the integrating type which produces a D.C. voltage output signal which progressively changes in potential in response to the aggregative amount of radiation detected by said detector over a given time interval; a second recycling electrometer whose input is connected to the output of said second detector, for producing an output pulse whenever the output voltage of said first detector reaches a certain predetermined level; timing signal generating means for generating a train of timing pulses; recording means for receiving a plurality of signal pulse trains from different sources and individually recording concurrently in correlative fashion each of the various pulse trains received as a series of pulse-indicating indicia, said recording means being connected to the respective outputs of said first and said second recycling electrometers and said timing signal generating means; and control means connected respectively to said timing signal generating means, to said recording means and to said first and said second recycling electrometers for controllably energizing these respective elements; said first and said second radiation detectors being respectively sensitive to different ranges of intensity of the radiation being detected, the respective pulse trains from said first and said second recycling electrometers being individually recorded as series of pulse-indicating indicia by said recording means with reference to a time base defined by the pulse-indicating indicia derivative from said timing pulses, whereby said apparatus for detecting and recording radiation intensity reflects the radiation intensity linearly with respect to time without compressed conversion of such radiation intensity data.

13. An apparatus for detecting and recording radiation intensity as a function of time which comprises a radiation detector of the integrating type which produces a D.C. voltage output signal which progressively changes in potential in response to the aggregative amount of radiation detected by said detector over a given time interval; a recycling electrometer, whose input is connected to the output of said detector, for producing an output pulse whenever the output voltage of said detector reaches a certain predetermined level; recording means for concurrently receiving and recording, on individual tracks, a plurality of pulse trains from different sources as pulse-indicating indicia, the output of said recycling electrometer being connected to said recording means; timing signal generating means for generating a train of timing pulses which are asynchronous with respect to the pulses from the output of said recycling electrometer, the output of said timing signal generating means being connected to the input of said recording means, said timing pulses being recorded by said recording means as timing-pulse-derivative indicia to provide a time base for time correlation of the pulses coming from said recycling electrometer; and control means connected respectively to said timing signal generating means, to said recording means and to said recycling electrometer for controllably energizing these respective elements.

References Cited in the file of this patent

UNITED STATES PATENTS

| | | |
|---|---|---|
| 2,803,405 | Howell | Aug. 20, 1957 |
| 2,937,276 | Thourson | May 17, 1960 |